United States Patent
Dasgupta et al.

(10) Patent No.: US 11,568,142 B2
(45) Date of Patent: Jan. 31, 2023

(54) EXTRACTION OF TOKENS AND RELATIONSHIP BETWEEN TOKENS FROM DOCUMENTS TO FORM AN ENTITY RELATIONSHIP MAP

(71) Applicant: Infosys Limited, Bangalore (IN)

(72) Inventors: Sudipto Shankar Dasgupta, Sunnyvale, CA (US); Mayoor Rao, Sunnyvale, CA (US); Ganapathy Subramanian, Sunnyvale, CA (US); Sairam Yeturi, Secunderabad (IN)

(73) Assignee: INFOSYS LIMITED, Bangalore (IN)

( * ) Notice: Subject to any disclaimer, the term of this patent is extended or adjusted under 35 U.S.C. 154(b) by 51 days.

(21) Appl. No.: 16/371,076

(22) Filed: Mar. 31, 2019

(65) Prior Publication Data
US 2019/0370325 A1 Dec. 5, 2019

(51) Int. Cl.
G06F 17/00 (2019.01)
G06F 40/284 (2020.01)
G06F 40/216 (2020.01)

(52) U.S. Cl.
CPC .......... *G06F 40/284* (2020.01); *G06F 40/216* (2020.01)

(58) Field of Classification Search
CPC ...... G06F 40/30; G06F 16/285; G06F 40/295; G06F 16/367; G06F 16/288; G06F 16/9024; G06F 40/247; G06F 16/3344; G06F 16/951; G06F 40/242; G06F 16/316; G06F 16/374; G06F 16/93; G06F 40/268; G06F 40/284; G06F 40/44; G06F 40/10; G06F 40/205; G06F 40/289; G06F 16/3343; G06F 40/00; G06F 40/20; G06F 40/216;
(Continued)

(56) References Cited

U.S. PATENT DOCUMENTS 7,162,465 B2 * 1/2007 Jenssen ................ G06F 40/242
7,685,083 B2 3/2010 Fairweather
(Continued)

FOREIGN PATENT DOCUMENTS

CN 109241538 1/2019

OTHER PUBLICATIONS

Sarwar, Sheikh Muhammad, John Foley, and James Allan. "Term relevance feedback for contextual named entity retrieval." Proceedings of the 2018 Conference on Human Information Interaction & Retrieval. 2018. (Year: 2018).*
(Continued)

Primary Examiner — Michael Ortiz-Sanchez
(74) Attorney, Agent, or Firm — Troutman Pepper Hamilton Sanders LLP (Rochester)

(57) ABSTRACT

A system and method of creating an entity relationship map includes receiving a stream of lexical matter associated with one or more categories (302) and identifying one or more tokens from the received lexical matter based on the one or more categories (304). A frequency of one or more of unique lexical token and recurring lexical token are determined (306) and one or more outliers based on a standard deviation range associated with the at least one category is eliminated (308). Sentences with the one or more recurring lexical tokens are selected (310) to find one or more lexical neighbors and the entity relationship map is created based on an association between the unique lexical tokens and the at least one lexical neighbor (312).

12 Claims, 8 Drawing Sheets

(58) Field of Classification Search
CPC ... G06F 40/211; G06F 40/279; G06K 9/6267; G06K 9/6218; G10L 15/18; G10L 15/1822; G10L 15/183; G10L 15/1815; G10L 2015/025; G06N 20/00
See application file for complete search history.

(56) References Cited

U.S. PATENT DOCUMENTS

| | | | |
|---|---|---|---|
| 8,429,179 B1 | 4/2013 | Mirhaji | |
| 9,116,982 B1* | 8/2015 | Stern | G06F 16/288 |
| 9,483,532 B1 | 11/2016 | Zhang et al. | |
| 9,684,683 B2 | 6/2017 | Dang et al. | |
| 2008/0301094 A1* | 12/2008 | Zhu | G06F 16/34 |
| 2013/0031126 A1* | 1/2013 | Setlur | G06F 16/248 |
| | | | 707/769 |
| 2013/0073571 A1 | 3/2013 | Coulet et al. | |
| 2013/0144893 A1 | 6/2013 | Voigt et al. | |
| 2015/0178372 A1* | 6/2015 | Seal | G06F 16/367 |
| | | | 707/737 |
| 2016/0224645 A1 | 8/2016 | Dang | |
| 2017/0017897 A1* | 1/2017 | Bugay | G06F 40/18 |
| 2017/0331786 A1* | 11/2017 | Lai | G06F 40/129 |
| 2018/0060734 A1* | 3/2018 | Beller | G06N 20/00 |
| 2018/0173795 A1* | 6/2018 | Cobbett | G06F 16/316 |
| 2019/0102430 A1* | 4/2019 | Wang | G06F 16/367 |
| 2019/0147036 A1* | 5/2019 | Fuoco | G10L 15/02 |
| | | | 704/9 |

OTHER PUBLICATIONS

European Search Report received in counterpart European Patent Application No. 19178162.4, dated Oct. 8, 2019, 7 pages.

Danilo S. et al., "Graphia: Extracting Contextual Relation Graphs from Text," International Conference on Computer Analysis of Images and Patterns, CAIP 2017; Computer Analysis of Images and Patterns [Lecture Notes in Computer Science; Lect. Notes Computer] Springer, Berlin, Heidelberg, May 26, 2013, pp. 236-241.

Nguyen et al., "Subtree mining for relation extraction from Wikipedia," Apr. 22, 2007, pp. 125-128.

Yu et al., "Learning Composition Models for Phrase Embeddings," *Transactions of the Association for Computational Linguistics*, vol. 3, pp. 227-242, 16 pages, May 2015.

Socher et al., "Learning Continuous Phrase Representations and Syntactic Parsing with Recursive Neural Networks," retrieved from https://nlp.stanford.edu/pubs/2010SocherManningNg.pdf, 9 pages, Jan. 2010.

* cited by examiner

EXTRACTION OF TOKENS AND RELATIONSHIP BETWEEN TOKENS FROM DOCUMENTS TO FORM AN ENTITY RELATIONSHIP MAP

FIELD OF TECHNOLOGY

The present disclosure relates to methods and systems for building an entity relationship map. More particularly, building an entity relationship map by extracting tokens and relationship between tokens extracted from a document.

BACKGROUND

Automated data processing systems typically include an excerptor module and a data processing module. The excerptor module is a "collector". The processing module includes a set of elements which operate upon the collector input text (natural language text) in order to process the text and generate frequency of lexical matter. Automated data processing systems designed in this manner provide for an efficient document map capable of achieving great benefits in performing tasks such as data reclamation and co-relations within the document stream.

Most often, the processing begins with the collector module fetching a continuous stream of electronic text from the document stream. It is then decomposed into individual words, sentences, and messages. For instance, individual words can be identified by joining together a string of adjacent character codes between two consecutive occurrences of a white space code (i.e. a space, tab, and/or carriage return).

These individual words identified by the processor are actually just "tokens" that may be found as entries in the excerptor module, which is usually contains a grouped and predefined collection of such tokens. In particular, previously used token mechanisms used to store and process all lexical and non-lexical content (i.e. "tokens") found in the document stream. But it is not desirable, to process and store numeric values, special characters, and other forms as with other information processing and data reclamation modules in prior art.

SUMMARY

Disclosed are a method, apparatus and/or a system to build an entity relationship map from tokens and relationships between tokens.

In one aspect, a method of creating an entity relationship map includes receiving a stream of lexical matter associated with one or more categories and identifying one or more tokens from the received lexical matter based on the one or more categories. A frequency of one or more of unique lexical tokens and recurring lexical tokens are determined and one or more outliers based on a standard deviation range associated with the one or more categories are eliminated. Sentences with the one or more recurring lexical tokens are selected to find one or more lexical neighbors and the entity relationship map is created based on an association between the unique lexical tokens and the one or more lexical neighbors.

In another aspect, a system of creating an entity relationship map comprises a cluster computer network, a text analytics system, one or more processors coupled over the cluster computer network, a machine-readable storage location, and one or more streams of lexical matter associated with the storage location. The stream of lexical matter associated with one or more categories is received, through the one or more processors, over the cluster computer network by the text analytics system and one or more tokens from the received lexical matter are identified, through the one or more processors, based on the one or more categories. Further, a frequency of one or more of unique lexical token and recurring lexical token is determined and one or more outliers are eliminated, through the one or more processors, based on a standard deviation range associated with the one or more categories. One or more sentences with the one or more recurring lexical tokens is selected, through the one or more processors, to find one or more lexical neighbors and the entity relationship map is created based on an association between the unique lexical tokens and the one or more lexical neighbors. Further, the entity relationship map is stored onto the machine-readable storage location through the text analytics system over the cluster computer network.

In yet another aspect, a method of extracting tokens from a lexical stream, the method includes one or more sentences that are extracted from the stream of lexical matter based on one or more categories. Further, one or more noun phrases associated with the extracted one or more sentences is identified. The one or more sentences is associated with one or more documents. A frequency of the one or more identified noun phrases associated with the one or more documents is identified. The one or more noun phrases are associated with one or more tokens. Further, the one or more tokens that are repeating are identified through frequency distribution and a relationship between a token in a sentence and another token in the sentence is identified through a verb in the sentence. The steps of the method are repeated until an entity relationship map of the document is complete.

The methods and systems disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

The embodiments of the present invention are illustrated by way of example and not as limitation in the figures of the accompanying drawings, in which like references indicate similar elements and in which.

Other features of the present embodiments will be apparent from the accompanying drawings and from the detailed description that follows.

DETAILED DESCRIPTION

Example embodiments, as described below, may be used to provide a method, an apparatus and/or a system of building an entity relationship map from tokens and relationships between tokens.

Although the present embodiments have been described with reference to specific example embodiments, it will be evident that various modifications and changes may be made to these embodiments without departing from the broader spirit and scope of the various embodiments.

In one or more embodiments, a method of creating an entity relationship map includes a stream of lexical matter associated with one or more categories that may be received and identifying one or more tokens from the received lexical matter based on the one or more categories. A frequency of one or more of unique lexical tokens and recurring lexical token may be determined and one or more outliers based on a standard deviation range associated with the one or more categories are eliminated. Sentences with the one or more recurring lexical tokens may be selected to find one or more lexical neighbors and the entity relationship map is created based on an association between the unique lexical tokens and the one or more lexical neighbors.

In one or more embodiments, a system of creating an entity relationship map comprises a cluster computer network, a text analytics system, one or more processors coupled over the cluster computer network, a machine-readable storage location, and one or more streams of lexical matter associated with the storage location. The stream of lexical matter associated with one or more categories is received, through the one or more processors, over the cluster computer network by the text analytics system and one or more tokens from the received lexical matter are identified, through the one or more processors, based on the one or more categories. Further, a frequency of one or more of unique lexical token and recurring lexical token is determined and one or more outliers are eliminated, through the one or more processors, based on a standard deviation range associated with the one or more categories. One or more sentences with the one or more recurring lexical tokens is selected, through the one or more processors, to find one or more lexical neighbors and the entity relationship map is created based on an association between the unique lexical tokens and the one or more lexical neighbors. Further, the entity relationship map is stored onto the machine-readable storage location through the text analytics system over the cluster computer network.

Figure 1:
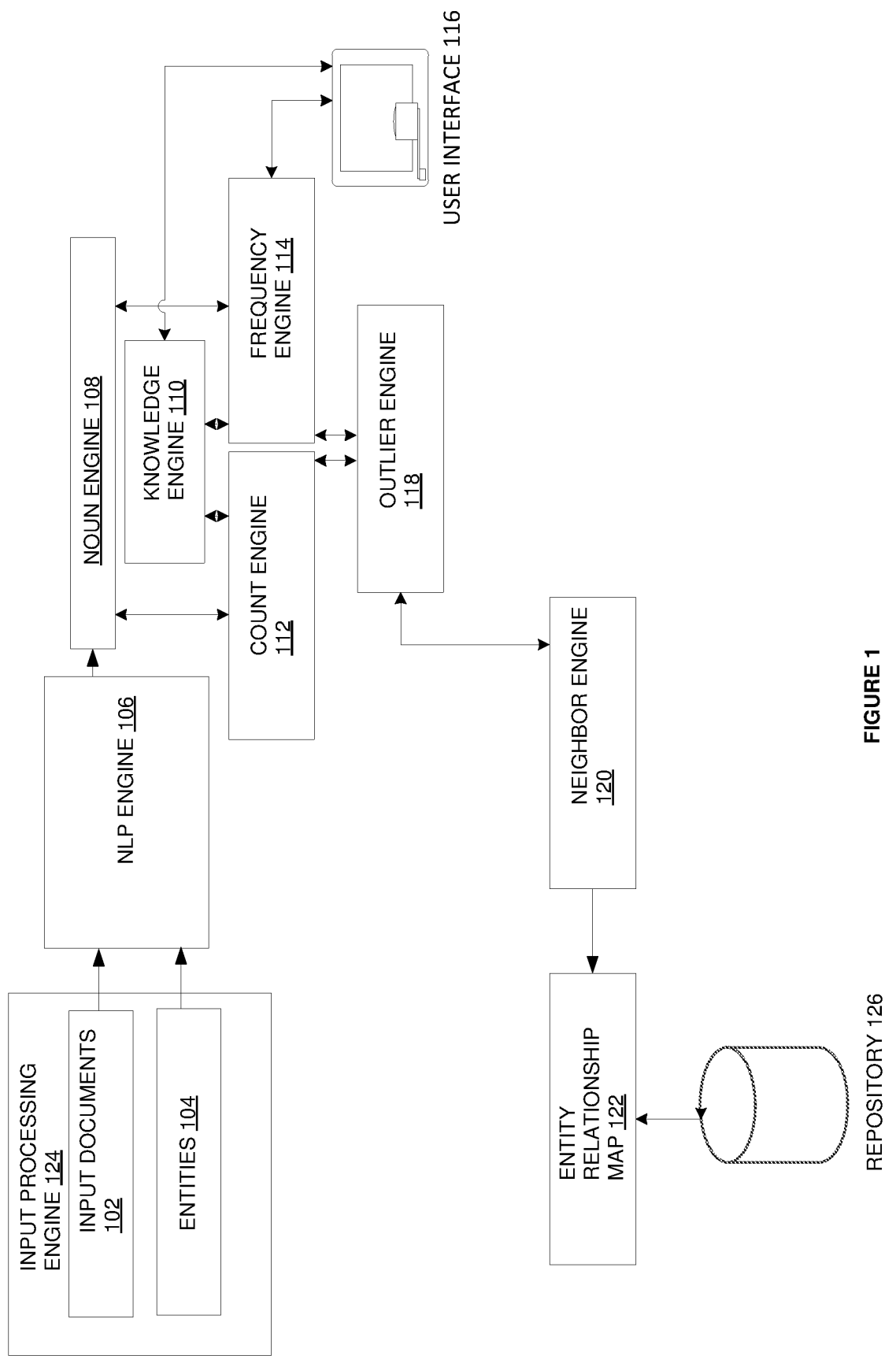
FIG. 1 illustrates a system for automated extraction of tokens and relationship between tokens from text, according to one embodiment.

FIG. 1 illustrates a system for automated extraction of tokens and relationship between tokens from text, according to one embodiment.

The system for automated extraction of tokens and relationship between tokens includes an input processing engine 124, NLP Engine 106, noun engine 108, knowledge engine 110, count engine 112, frequency engine 114, user interface 116, outlier engine 118, neighbor engine 120, entity relationship map 122 and repository 126. The input processing engine 124 receives inputs documents 102 and entities 104.

The NLP engine 106 may parse an input from the input processing engine 124 to generate nouns in association with the noun engine 108. The noun engine 108 may be communicatively coupled to the count engine 112 and frequency engine 114. The outlier engine 118 identifies outliers in the nouns generated and/or identified by the noun engine 108. The neighbor engine 120 may identify neighbors in nouns that have a count exceeding a pre-determined count. The neighbor engine 120 may help determination of the entity relationship map 122 to be stored at the repository 126.

In one or more embodiments, one or more user actions are collected and maintained at the repository through a knowledge engine 110. In one or more embodiments, the entities, which are labelled as ambiguous are presented to a user through a user interface 116. The user may resolve ambiguous entities. In one or more embodiments, a user action by a user may choose "ROME" to be a City and not a person in the context of a document. The user action may be collected and maintained onto the knowledge engine 110.

In one or more embodiments, a named entity AND/OR an entity may be a real-world object, such as person, location, organization, product, etc., that is denoted with a proper name.

In various embodiments, an entity relationship (ER) map may show relationships between entities and/or tokens. Each entity relationship map may be associated with one or more documents stored in a database. An entity in may be a component of data. In one or more embodiments, an ER map may illustrate a logical structure of a document(s).

In one or more embodiments, an entity may not be determined based on multiple reasons such as domain details of the entity being unknown to the system. Another reason may be the domain of the entity is overlapping with more than one domains. For example, the entity 'Rome' may be a place or a name of a person.

In one or more embodiments, tokens may be individual words identified in a lexical stream. In an example embodiment, the system may parse a lexical stream into sentences and tokens. However, while parsing into tokens, the system may not only consider single words as tokens, but may consider chunks of meaningful tokens. Further, processing of text may involve the following steps: Stop word Removal, removal of punctuations except ".", "?", "!" and "-", tokenizing into sentences and tokenizing the text into chunks of phrases that are either tokens, named entities and/or noun phrases. Each of the tokens, named entities and noun phrases may be considered as one single unit of token.

In an example embodiment, a lexical stream may include "Donald Trump is the 45$^{th}$ President of the United States of America". In one embodiment, the lexical stream may be parsed to identify "Donald Trump", "45$^{th}$ President", and "United States of America" as tokens or Named entities.

In one or more embodiments, a token extraction mechanism that uses a collector module may encounter problems regarding selective storage and processing of information found in the stream of text.

Previously used token mechanisms used to store and process all lexical and non-lexical content (i.e. "tokens") found in a document stream. But it is not desirable means of storing and processing lexical content from an entity relationship document map standpoint. To process and store numeric values, special characters, and other forms as with other information processing and data reclamation modules is an unnecessary burden. Rather, it is ideal to that a collector only identifies lexical matter as tokens. These Tokens may be only those character sets forming sentences that are relevant to such data reclamation, and accurate linguistic processing. The tokens identified may be then worth storing and processing. In one or more embodiments, the processes and systems described herein may not necessarily be limited to text or lexical matter.

In one or more embodiments, a process of generating an entity relationship map may include tokens that are subjected to processing across the document stream to determine frequency of unique lexical tokens and recurring tokens. The unique lexical tokens may be bigrams, trigrams and/or n-gram. The unique lexical tokens and the recurring tokens may be identified by means of an incidence element associated with a processing module. The processing module may identify sentences wherein the recurring tokens may be present. Further, the processing module may associate a sentence relationship by lexical groups. Further, the process may be repeated to obtain an entity relationship map.

In one or more embodiments, the input processing engine 124 may be associated with input documents 102 and entities 104. The input processing engine 124 may be responsible for cleaning, normalizing and standardizing an input given to the system. The inputs may come from different sources such as the input documents 102 and entities 104. The input may be documents of any type, for example, OCR documents, PDF documents, Word Documents, Emails, Meeting Transcripts, Books, Speech to Text input, etc. The input processing engine 124 may convert the input into a form that may be processed by the NLP engine 106. A type of cleaning, normalization and standardization step taken by the input processing engine 124 may depend upon the input.

In one or more embodiments, the systems and methods disclosed herein are hybrid in nature. Hybrid may be used to refer to a combination of supervised and unsupervised training approaches.

In one or more embodiments, an external corpus, apart from the input may also be used for training the model. A use of external corpus may increase the accuracy of the system. A choice of external corpus might be domain dependent. In an example embodiment, in an absence of any such training data, a standard model may be made available to be trained on English Wikipedia® corpus (publicly available), a huge corpus of news articles and scientific articles from sources such as arxiv.org (publicly available).

In one or more embodiments, advantages of the system described herein may include a hybrid approach that takes advantages of both supervised and unsupervised approaches in keyword extraction in order to build a robust model for token extraction.

Figure 2:
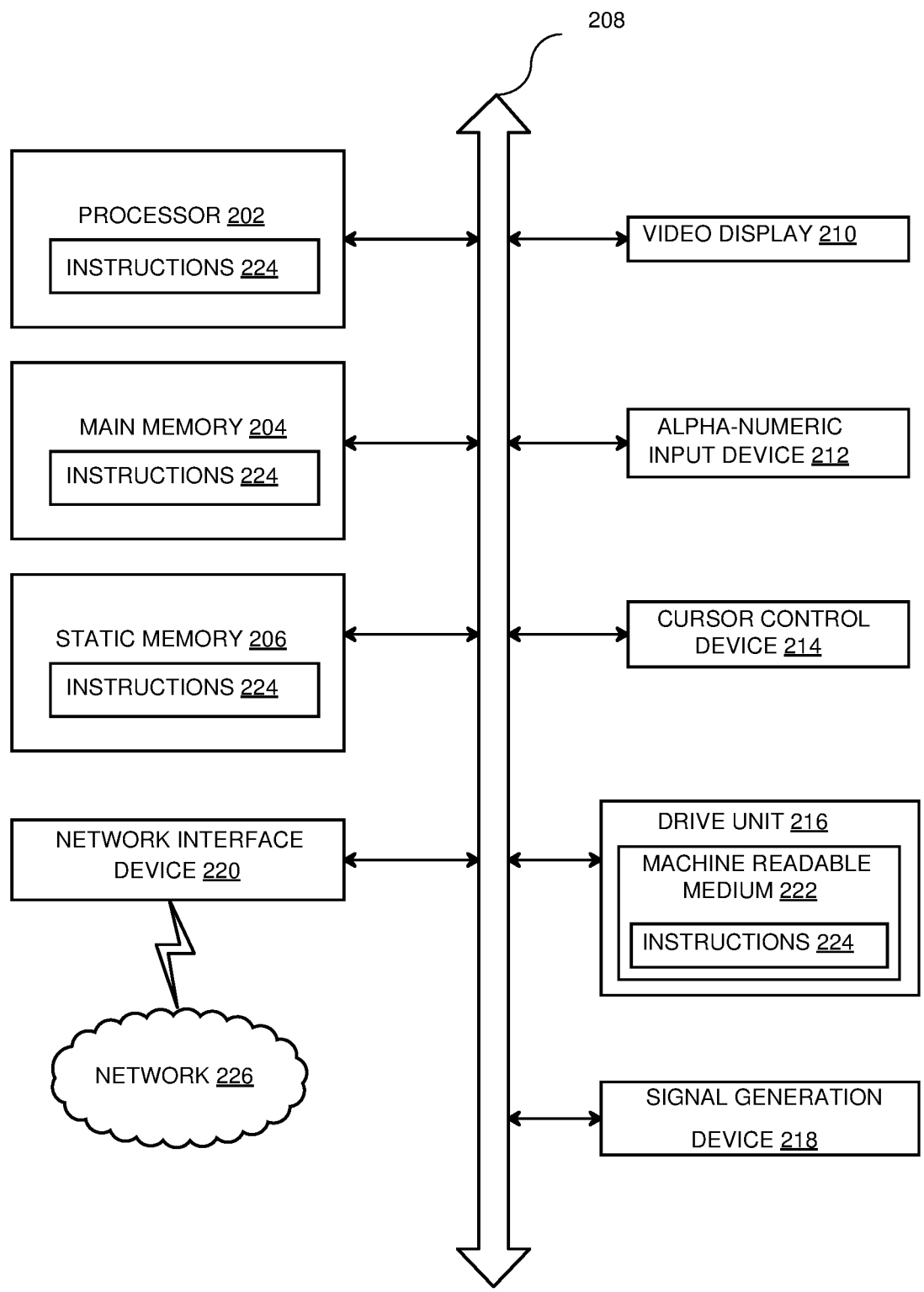
FIG. 2 is a diagrammatic representation of a data processing system capable of processing a set of instructions to perform any one or more of the methodologies herein, according to one embodiment.

FIG. 2 is a diagrammatic representation of a data processing system capable of processing a set of instructions to perform any one or more of the methodologies herein, according to an example embodiment. FIG. 2 shows a diagrammatic representation of machine in the example form of a computer system 200 within which a set of instructions, for causing the machine to perform any one or more of the methodologies discussed herein, may be executed. In various embodiments, the machine operates as a standalone device and/or may be connected (e.g., networked) to other machines.

In a networked deployment, the machine may operate in the capacity of a server and/or a client machine in server-client network environment, and or as a peer machine in a peer-to-peer (or distributed) network environment. The machine may be a personal-computer (PC), a tablet PC, a set-top box (STB), a Personal Digital Assistant (PDA), a cellular telephone, a web appliance, a network router, switch and or bridge, an embedded system and/or any machine capable of executing a set of instructions (sequential and/or otherwise) that specify actions to be taken by that machine. Further, while only a single machine is illustrated, the term "machine" shall also be taken to include any collection of machines that individually and/or jointly execute a set (or multiple sets) of instructions to perform any one and/or more of the methodologies discussed herein.

The example computer system includes a processor 202 (e.g., a central processing unit (CPU) a graphics processing unit (GPU) and/or both), a main memory 204 and a static memory 206, which communicate with each other via a bus 208. The computer system 200 may further include a video display unit 210 (e.g., a liquid crystal displays (LCD) and/or a cathode ray tube (CRT)). The computer system 200 also includes an alphanumeric input device 212 (e.g., a keyboard), a cursor control device 214 (e.g., a mouse), a disk drive unit 216, a signal generation device 218 (e.g., a speaker) and a network interface device 220.

The disk drive unit 216 includes a machine-readable medium 222 on which is stored one or more sets of instructions 224 (e.g., software) embodying any one or more of the methodologies and/or functions described herein. The instructions 224 may also reside, completely and/or at least partially, within the main memory 204 and/or within the processor 202 during execution thereof by the computer system 200, the main memory 204 and the processor 202 also constituting machine-readable media.

The instructions 224 may further be transmitted and/or received over a network 226 via the network interface device 220. While the machine-readable medium 222 is shown in an example embodiment to be a single medium, the term "machine-readable medium" should be taken to include a single medium and/or multiple media (e.g., a centralized and/or distributed database, and/or associated caches and servers) that store the one or more sets of instructions. The term "machine-readable medium" shall also be taken to include any medium that is capable of storing, encoding and/or carrying a set of instructions for execution by the machine and that cause the machine to perform any one or more of the methodologies of the various embodiments. The term "machine-readable medium" shall accordingly be taken to include, but not be limited to, solid-state memories, optical and magnetic media, and the like. The term "machine-readable medium" does not refer to signals.

Figure 3:
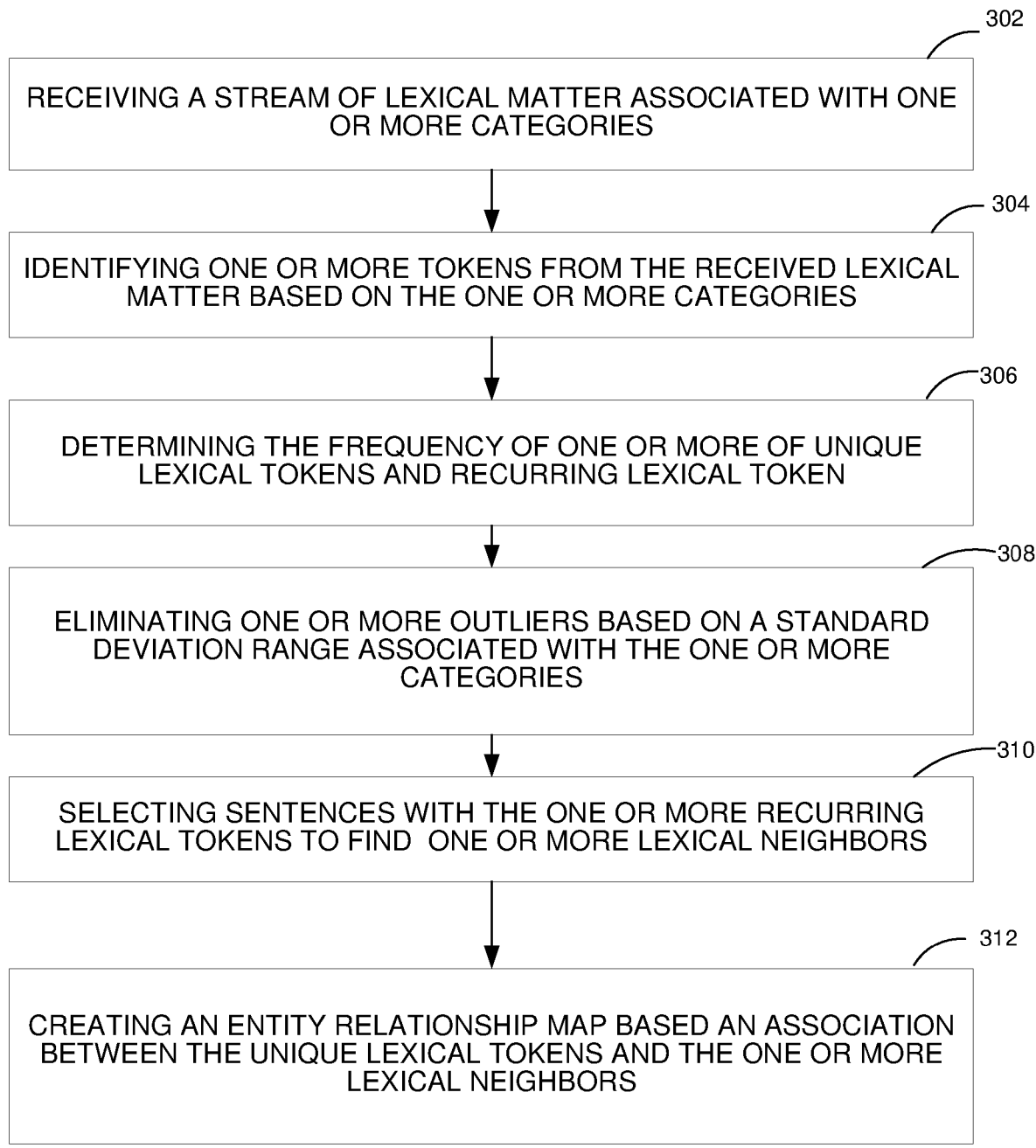
FIG. 3 is a process flow diagram detailing the operations of a method of creating an entity relationship map, according to one embodiment.

FIG. 3 is a process flow diagram detailing the operations of a method of creating an entity relationship map, according to one embodiment.

In one or more embodiments, a method of creating an entity relationship map includes a stream of lexical matter associated with one or more categories that may be received 302 and identifying one or more tokens from the received lexical matter based on the one or more categories 304. A frequency of one or more of unique lexical tokens and recurring lexical token may be determined 306 and one or more outliers based on a standard deviation range associated with the one or more categories are eliminated 308. Sentences with the one or more recurring lexical tokens may be selected to find one or more lexical neighbors 310 and the entity relationship map is created based on an association between the unique lexical tokens and the one or more lexical neighbors 312.

Figure 7:
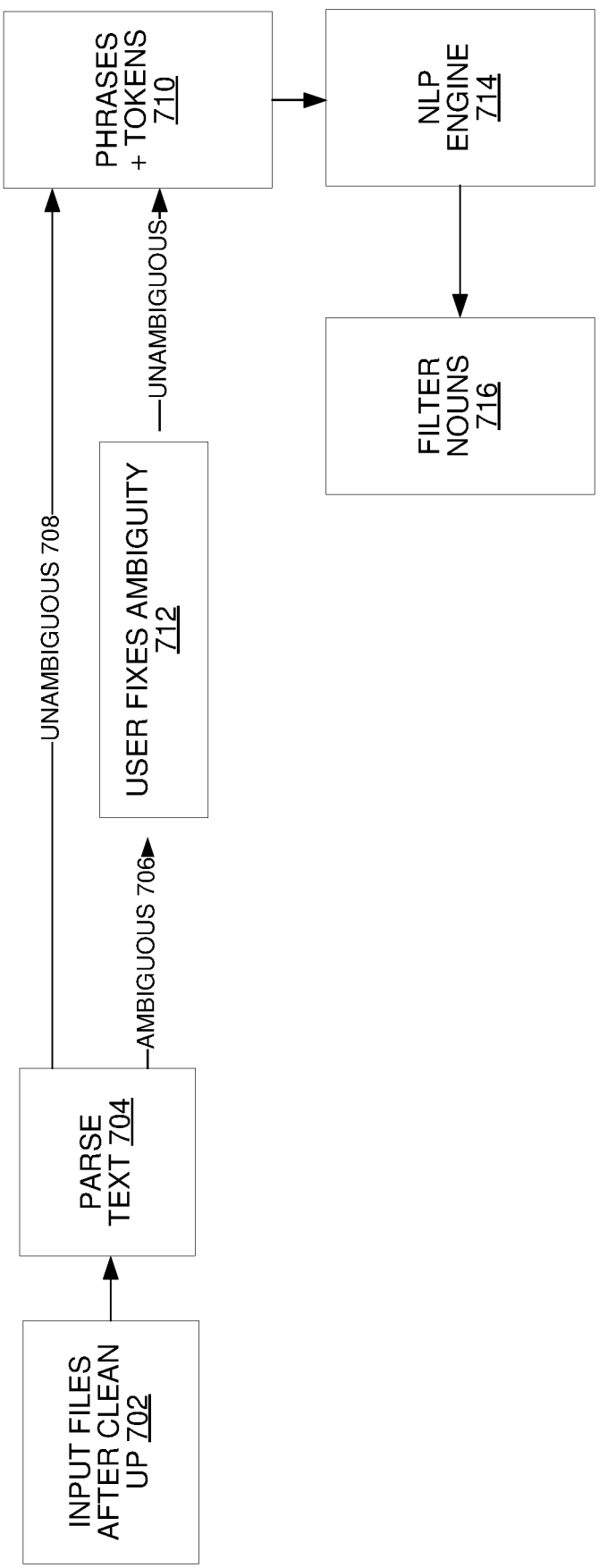
FIG. 7 illustrates the steps involved in parsing text to filter nouns, according to one embodiment.

In an example embodiment, one or more categories may include: DATE, TIME, PERCENT, MONEY, QUANTITY, ORDINAL, and CARDINAL. Further, categories may also refer to domain specific entities such as terms associated with an industry like oil & gas, software, services, consulting etc., FIG. 7 illustrates the steps involved in parsing text to filter nouns, according to one embodiment. In one or more embodiments, input files after clean-up 702 are parsed 704 to identify one or more of ambiguous 706 and/or unambiguous 708 phrases and/or tokens 710. Unambiguous phrases and/or tokens 710 may be fed onto a natural language processing (NLP) engine 714. A user may fix an ambiguity 712 through an input at a user interface. The NLP engine 714 may generate filtered nouns 716 based on multiple criteria.

Figure 4:
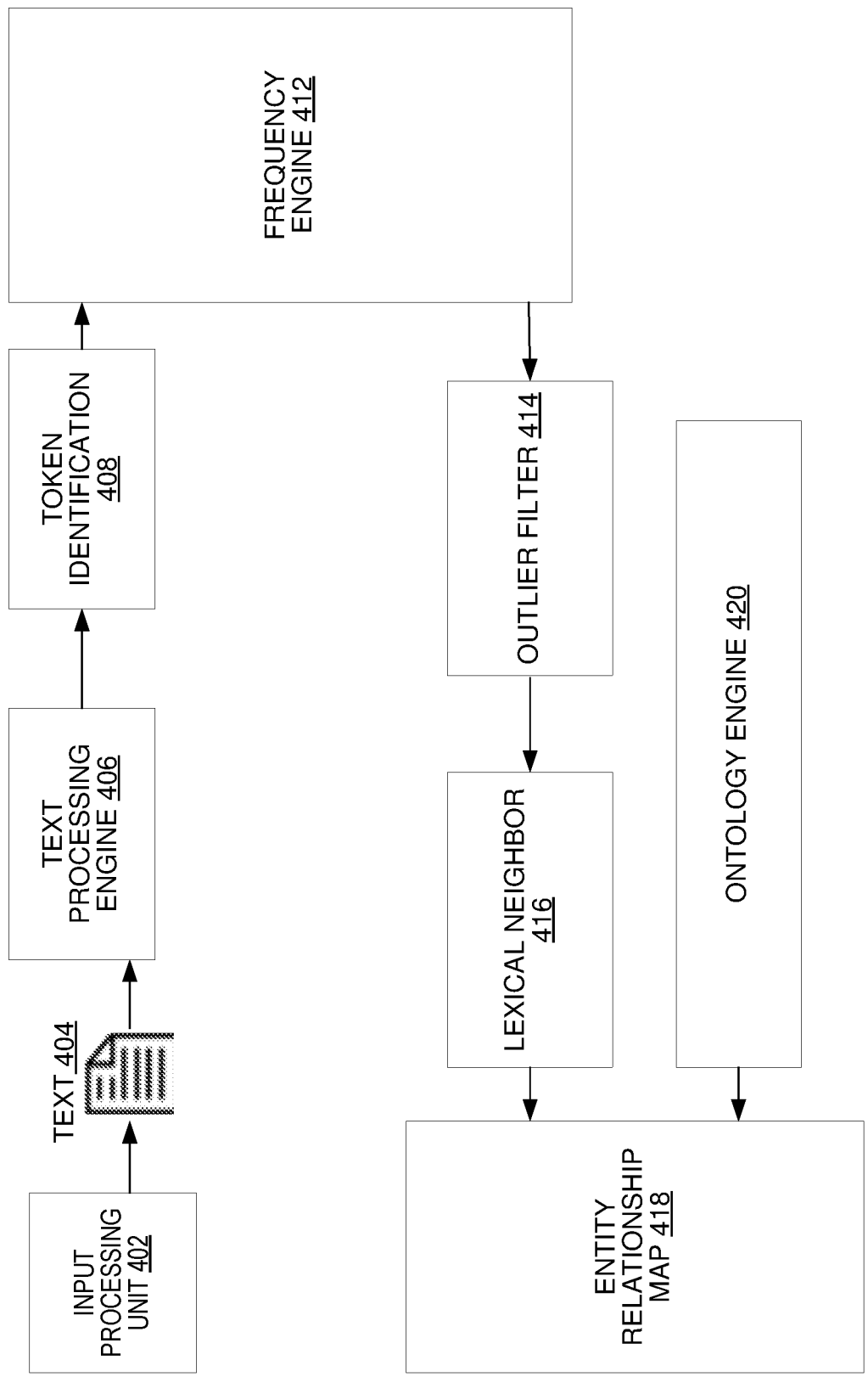
FIG. 4 illustrates the various engines and steps involved in the system disclosed herein, according to one embodiment.

FIG. 4 illustrates the various engines and steps involved in the system disclosed herein, according to one embodiment.

Input processing unit 402 receives input documents that may be processed into text 404. The text 404 may be utilized by the text processing engine 406 for token identification 408 through a token identification engine 408. Tokens identified by the token identification engine 408 may be counted through a frequency engine 412 and then outliers in the text may be removed through an outlier filter 414. In an example embodiment, the token identification engine 408 may identify tokens by parsing the input documents and identifying words separated by delimiters. In addition, the identified tokens may be used to identify one or more lexical neighbors 416. The one or more lexical neighbors 416 in conjunction with the frequency of the identified tokens and ontology engine 420 may be utilized to create an entity relationship map 418.

A frequency of one or more of unique lexical tokens and recurring lexical tokens may be determined and one or more outliers based on a standard deviation range associated with the one or more categories are eliminated through the outlier filter 414.

Figure 5:
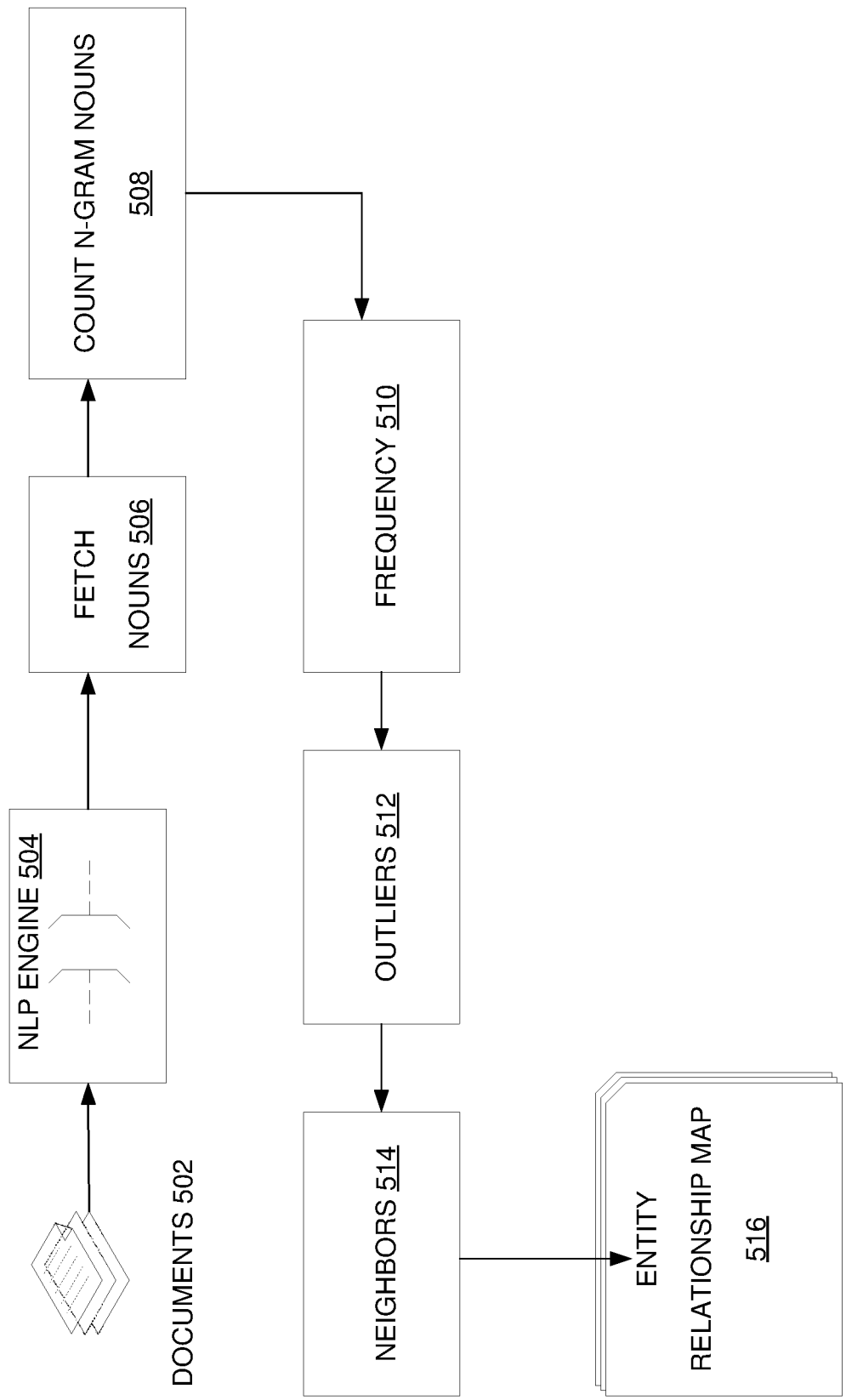
FIG. 5 illustrates the steps involved in creating an entity relationship map, according to an example embodiment.

FIG. 5 illustrates the steps involved in creating an entity relationship map, according to an example embodiment.

In one or more embodiments, documents 502 may be used as input to an NLP engine 504. The NLP engine 504 identifies and fetches nouns 506 from the input. N-gram nouns may be further identified to determine a frequency of nouns 510 and to further determine outliers 512. Lexical neighbors 514 may be identified for the N-gram nouns to be used to create an entity relationship map 516.

In one or more embodiments, Lexical neighbors may be words sharing phonological structure with a target word.

In an example embodiment, once a standardization input documents is completed, the system may parse a resultant text into sentences and tokens. However, while parsing into tokens, the system does not consider only single words as tokens, but takes into account a dependency parsing tree formed by a parser to identify chunks of meaningful tokens.

In an example embodiment, processing of text may involve the following steps:

Stop word Removal, removal of punctuations except ".", "?", "!" and "-", tokenizing into sentences and tokenizing the text into chunks of phrases.

Further, while creating tokens, all the chunks that satisfy the following criteria for English language may be filtered out:

Noun Phrases/Named Entities whose first word may belongs to a list of common adjectives and/or reporting verbs.

Further, Noun Phrases/Named Entities whose first word belongs to following parts of speech: Interjection, Auxiliary, Coordinating Conjunction, Adposition, Interjection, Numeral, Particle, Pronoun, Subordinating Conjunction, Punctuation, Symbol and Other.

Noun Phrases/Named Entities whose first word belongs to a list of functional words, Noun Phrases/Named Entities that contain a full numeric word, Noun Phrases/Named Entities that are fully numeric, Named entities that belong to the following categories may be filtered out: DATE, TIME, PERCENT, MONEY, QUANTITY, ORDINAL, and CARDINAL.

Figure 6:
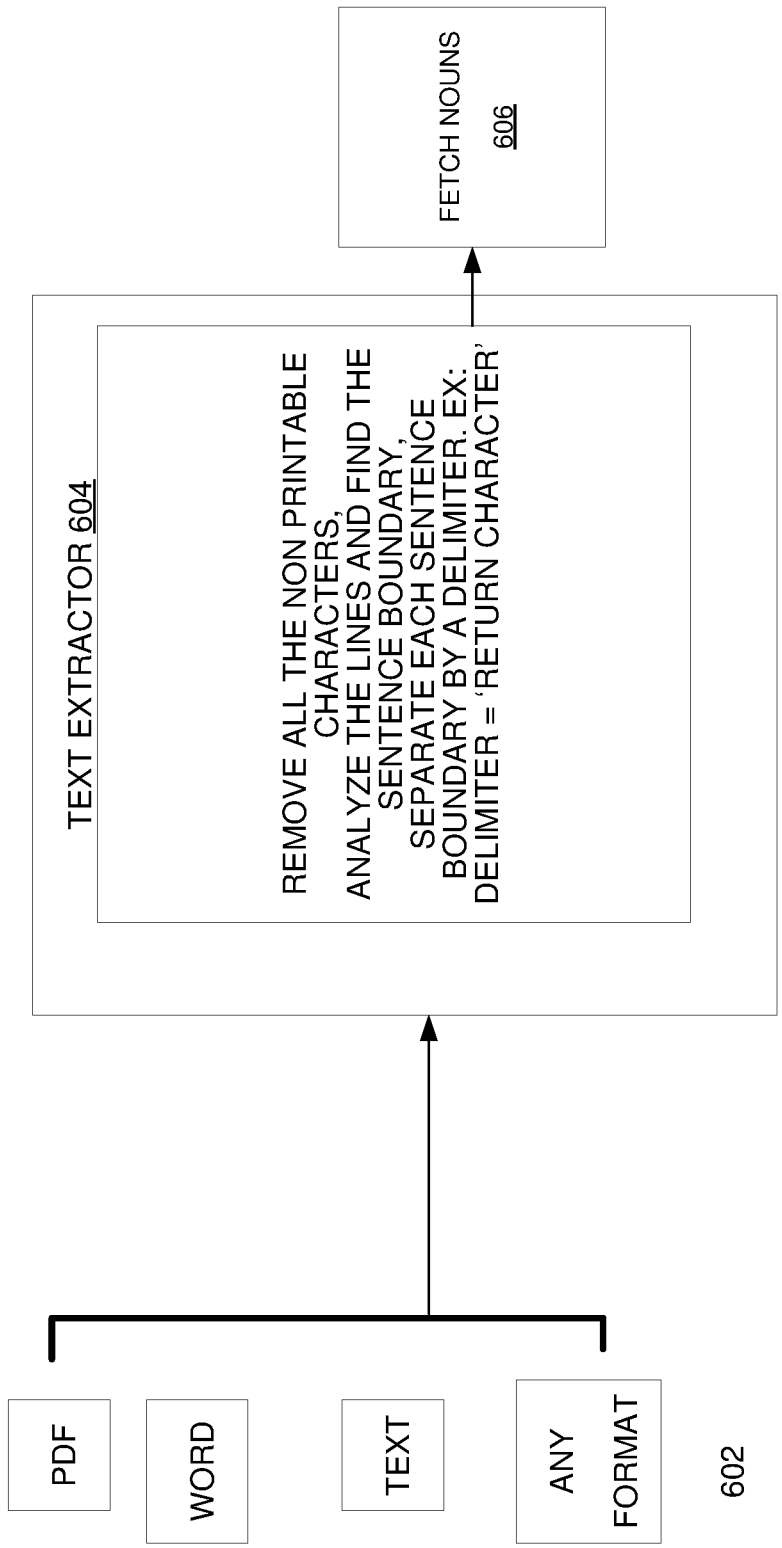
FIG. 6 illustrates the steps involved in extraction and clean up to fetch nouns, according to one embodiment.

FIG. 6 illustrates the steps involved in extraction and clean up to fetch nouns, according to one embodiment.

In one or more embodiments, files of different formats such as PDF, Word, and text etc., 602 may be input to a text extractor 604. The text extractor 604 may remove all non-printable characters, analyze lines and find sentence boundaries to further determine tokens. Further, the text extractor may separate each sentence boundary AND/OR token by a delimiter. The delimiter may be a 'return' character and/or a '.' and/or a 'space'. The extracted and cleaned data may be a set of nouns 606.

Figure 8:
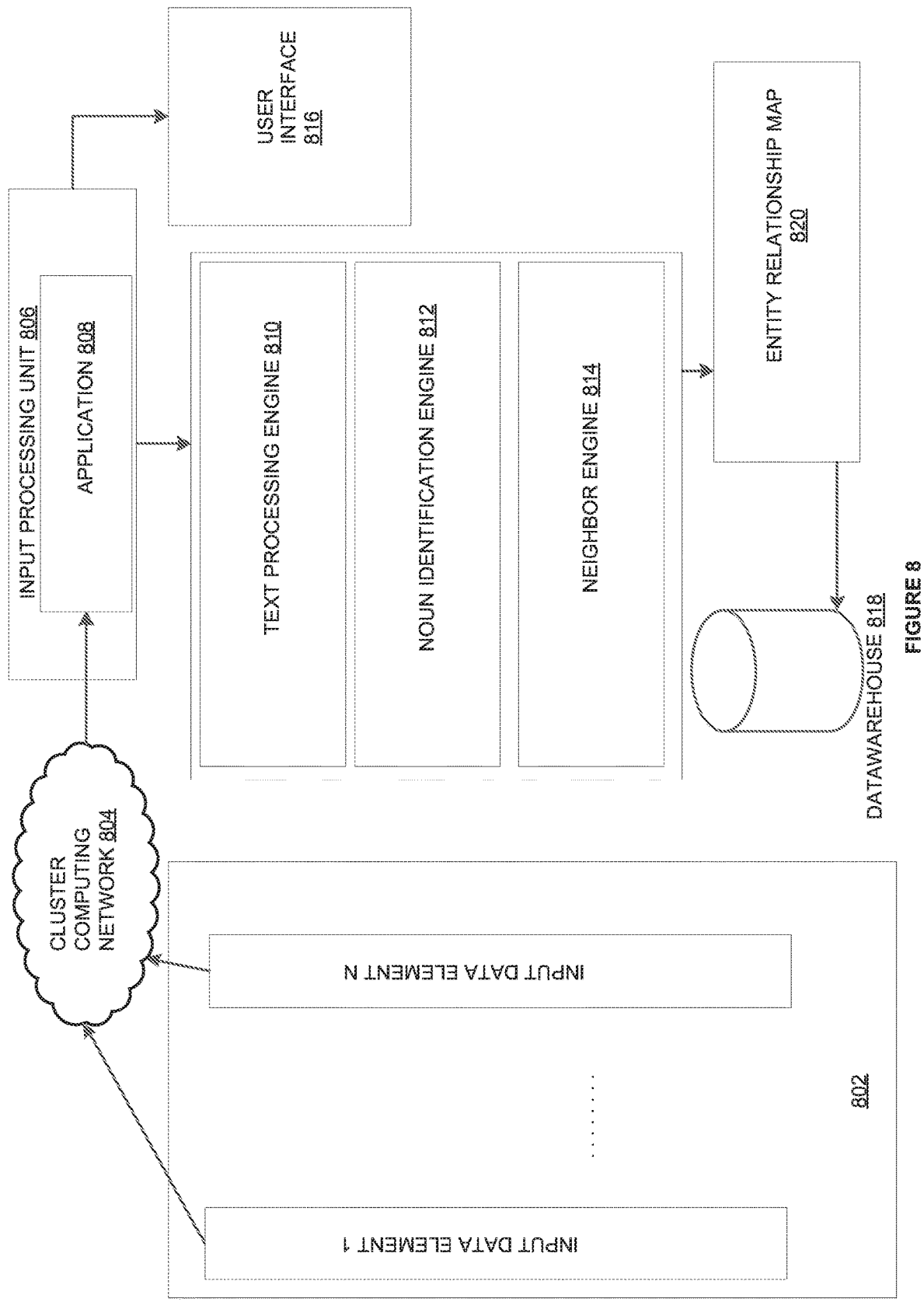
FIG. 8 illustrates the various blocks involved in creating an entity relationship map, according to one embodiment.

FIG. 8 illustrates the various blocks involved in creating an entity relationship map, according to one embodiment.

One or more input data elements 802 may receive an input onto a cluster computing network 804. The cluster computing network 804 may be associated with an input processing unit 806. The input processing unit 806 may be associated with the one or more applications 808 to assist in processing input. The input processing unit 806 may be directly and/or indirectly coupled to a user interface 816. The cluster computing network 804 may be associated with text processing engine 810, noun identification engine 812 and neighbor engine 814. The identified tokens may be stored onto a data warehouse 818.

In one or more embodiments, a method of extracting tokens from a lexical stream, includes one or more sentences that may be extracted from the stream of lexical matter received at the one or more input data elements 802 based on one or more categories. Further, one or more noun phrases associated with the extracted one or more sentences may be identified through the noun identification engine 812. The one or more sentences may be associated with one or more documents. A frequency of the one or more identified noun phrases associated with the one or more documents may be identified. The one or more noun phrases may be associated through a combination of text processing engine 810 and input processing unit 806 with one or more tokens. Further, the one or more tokens that may be repeating are identified through frequency distribution and a relationship between a token in a sentence and another token in the sentence is identified through a verb in the sentence. The steps of the method may be repeated until an entity relationship map 820 of the document is complete. The entity relationship map 820 and the identified tokens may be stored at the data warehouse 818.

In one or more embodiments, nouns may be unigram, bigram, trigram and so on (e.g., n-gram).

In an example embodiment, a safety consulting and certification firm may be associated several safety standards and manufactured part records (such as scanned documents, pdfs, text, rtf files and the like). The part records may be in form of unstructured data in different formats and source type, through which information retrieval may be required to correlate and build relationships within disparate datasets for faster information retrieval. Manual compliance checks to safety considerations and meeting standard clauses may mean someone would have to go through thousands of documents of different varieties and running texts within these documents to suggested alternate components from various manufactures and different models of alternate components to suggest right alternate parts. The same process may be automated by to all the document forms available to create entity mapping and reduce manual effort from days to minutes.

In one or more embodiments, a method of extracting tokens from a lexical stream, includes one or more sentences that may be extracted from the stream of lexical matter based on one or more categories. Further, one or more noun phrases associated with the extracted one or more sentences may be identified. The one or more sentences may be associated with one or more documents. A frequency of the one or more identified noun phrases associated with the one or more documents may be identified. The one or more noun phrases may be associated with one or more tokens. Further, the one or more tokens that may be repeating are identified through frequency distribution and a relationship between a token in a sentence and another token in the sentence is identified through a verb in the sentence. The steps of the method may be repeated until an entity relationship map of the document is complete.

In an example embodiment, in insurance business, where there may be multiple claim documents and an insurance plan may have multiple fields of diverse information. The documents may have acronyms which are contextual to the insurance business defined in different appendices on the document.

Manual parsing and extraction of information relating to a policy and claim may be an exorbitant exercise, and hence the necessity of automating the process and creating configurable rule based templates and programmatically fetching all the nouns, count all the consecutively occurring nouns (bi grams and trigrams), and identifying the outliers to eliminate the noisy text to determine the actual entity relationships between the policy and claims to showcase the as-is entity mapping to a policy and claim helping faster information retrieval and accurate information.

In an example embodiment, frequency distribution may be a number of instances a token repeating in a lexical stream AND/OR a document.

In an example embodiment, an entity relationship map associated with a document may be complete when a pre-defined threshold is reached. The pre-defined threshold may be set by a user of the system and/or may be a system defined entity.

In one or more embodiments, development of lexical analysis and parsing tools has been an important area of research in computer science. In the business world, there may be abundant tasks which are repetitive, though desire human intervention in manual parsing of documents (invoice, insurance, contracts etc.) and extracting information from the documents which are relevant for business decision making.

The extracted information may be common to varied forms of files as input data. Even in such limited cases, processing data may involve some amount of analysis (such as lexical content grouping and/or by deterministic rules to associate, group, relate forms of information), parsing alongside manual effort to extract information. Based on the information extracted either a system of records are updated and/or actions are triggered. Automatic information retrieval to augment the human capabilities may be a necessity to extract and understand the extracted information. The system herein may be able to find an intelligent automated mechanism of classification, parsing, grouping of information related to a particular business category (for example, for an invoice, insurance, contract), starting with no other information than a specification of a particular category, with configurable rule templates, and leading to accurate information retrieval forming an entity relationship map.

The utility is an apparatus that provides a system that automatically builds a lexical map on a document with a stream of text. Further, the system may syntactically analyze of text and dictionary-based analysis to understand content better for different applications, such as summarization, retrieval, and stemming. Therefore, developing intelligent and automated techniques for extracting lexical relationships is of great interest.

In various embodiments, user actions may be received through a user interface such as user interface 816. The user actions may be of various kinds including but not limited to resolving ambiguity, deciding a category of a document, information to analyzed, relevancy and/or irrelevance of information etc., In another example embodiment, a token extraction and entity relationship map system may deem the entity relationship map to be complete when the system cannot find any more relations between tokens.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry, firmware, software or any combination of hardware, firmware, and software (e.g., embodied in a machine-readable medium). For example, the various electrical structure and methods may be embodied using transistors, logic gates, and electrical circuits (e.g., application specific integrated (ASIC) circuitry and/or in Digital Signal Processor (DSP) circuitry).

In addition, it will be appreciated that the various operations, processes, and methods disclosed herein may be embodied in a machine-readable medium and/or a machine accessible medium compatible with a data processing system (e.g., a computer devices), and may be performed in any order (e.g., including using means for achieving the various operations). The medium may be, for example, a memory, a transportable medium such as a CD, a DVD, a Blu-ray™ disc, a floppy disk, or a diskette. A computer program embodying the aspects of the exemplary embodiments may be loaded onto the retail portal. The computer program is not limited to specific embodiments discussed above, and may, for example, be implemented in an operating system, an application program, a foreground or background process, a driver, a network stack or any combination thereof. The computer program may be executed on a single computer processor or multiple computer processors.

Accordingly, the specification and drawings are to be regarded in an illustrative rather than a restrictive sense.

What is claimed is:

1. A method of creating an entity relationship map, the method comprising:
   identifying, by a computing device, one or more tokens in lexical matter;
   determining, by the computing device, a frequency of each of the identified tokens in the lexical matter to identify which is a unique lexical token or a recurring lexical token;
   determining, by the computing device, which of a plurality of set portions of the lexical matter have at least one of the recurring lexical tokens;
   identifying, by the computing device, which of the plurality of the set portions are determined to have at least one of the recurring lexical tokens;

identifying, by the computing device, at least one lexical neighbor in each of the plurality of the set portions determined to have at least one of the recurring lexical tokens; and creating, by the computing device, an entity relationship map based on the identified at least one lexical neighbor and one or more of the identified tokens in each of the one or more of the set portions determined to have at least one of the recurring lexical tokens, wherein the identifying the one or more tokens, determining the frequency, determining at least one recurring lexical tokens, and identifying the at least one lexical neighbor is performed until the created entity relationship map is determined to be complete when a pre-defined threshold is reached, wherein the pre-defined threshold is dynamically adjusted based on user feedback and a system defined entity.

2. The method of claim 1 further comprising:
extracting, by the computing device, the one or more set portions comprising one or more sentences from the lexical matter.

3. The method of claim 1 wherein the identified tokens comprise noun phrases.

4. The method of claim 1 wherein the lexical action tokens comprise verbs.

5. A non-transitory computer readable medium having stored thereon instructions comprising executable code which when executed by one or more processors, causes the one or more processors to:
identify one or more tokens in lexical matter;
determine a frequency of each of the identified tokens in the lexical matter to identify which is a unique lexical token or a recurring lexical token;
determine which of a plurality of set portions of the lexical matter have at least one of the recurring lexical tokens;
identify which of the plurality of the set portions determined to have at least one of the recurring lexical tokens;
identify at least one lexical neighbor in each of the plurality of the set portions determined to have at least one of the recurring lexical tokens; and
create an entity relationship map based on the identified at least one lexical neighbor and one or more of the identified tokens in each of the one or more of the set portions determined to have at least one of the recurring lexical tokens, wherein the identifying the one or more tokens, determining the frequency, determining at least one recurring lexical tokens, and identifying the at least one lexical neighbor is performed until the created entity relationship map is determined to be complete when a pre-defined threshold is reached, wherein the pre-defined threshold is dynamically adjusted based on user feedback and a system defined entity.

6. The non-transitory computer readable medium of claim 5 wherein the executable code when executed by the one or more processors further causes the one or more processors to:
extract the one or more set portions comprising one or more sentences from the lexical matter.

7. The non-transitory computer readable medium of claim 5 wherein the identified tokens comprise noun phrases.

8. The non-transitory computer readable medium of claim 1 wherein the lexical action tokens comprise verbs.

9. A computing device, comprising memory comprising programmed instructions stored thereon and one or more processors configured to be capable of executing the stored programmed instructions to:
identify one or more tokens in lexical matter;
determine a frequency of each of the identified tokens in the lexical matter to identify which is a unique lexical token or a recurring lexical token;
determine which of a plurality of set portions of the lexical matter have at least one of the recurring lexical tokens;
identify which of the plurality of the set portions determined to have at least one of the recurring lexical tokens;
identify at least one lexical neighbor in each of the plurality of the set portions determined to have at least one of the recurring lexical tokens; and
create an entity relationship map based on the identified at least one lexical neighbor and one or more of the identified tokens in each of the one or more of the set portions determined to have at least one of the recurring lexical tokens, wherein the identifying the one or more tokens, determining the frequency, determining at least one recurring lexical tokens, and identifying the at least one lexical neighbor is performed until the created entity relationship map is determined to be complete when a pre-defined threshold is reached, wherein the pre-defined threshold is dynamically adjusted based on user feedback and a system defined entity.

10. The device of claim 9 wherein the one or more processors are further configured to be capable of executing the stored programmed instructions to:
extract the one or more set portions comprising one or more sentences from the lexical matter.

11. The device of claim 9 wherein the identified tokens comprise noun phrases.

12. The device of claim 9 wherein the lexical action tokens comprise verbs.

* * * * *

UNITED STATES PATENT AND TRADEMARK OFFICE
CERTIFICATE OF CORRECTION

| | |
|---|---|
| PATENT NO. | : 11,568,142 B2 |
| APPLICATION NO. | : 16/371076 |
| DATED | : January 31, 2023 |
| INVENTOR(S) | : Sudipto Shankar Dasgupta et al. |

It is certified that error appears in the above-identified patent and that said Letters Patent is hereby corrected as shown below:

On the Title Page

Insert item (30) --Foreign Application Priority Data,-- and under "Foreign Application Priority Data," insert --June 11, 2018 (IN) 2018/41021781--

Signed and Sealed this
Twenty-seventh Day of August, 2024

Katherine Kelly Vidal
*Director of the United States Patent and Trademark Office*